United States Patent Office 3,781,273
Patented Dec. 25, 1973

3,781,273
N(6)-BENZYL-ADENOSINE COMPOUNDS AND
THERAPEUTIC COMPOSITIONS
Wolfgang Kampe, Heddesheim, Erich Fauland, Mannheim-Waldhof, Max Thiel, Mannheim, Karl Dietmann, Mannheim-Vogelstang, and Wolfgang Juhran, Mannheim, Germany, asssignors to Boehringer Mannheim GmbH, Mannheim, Germany
No Drawing. Filed Feb. 3, 1971, Ser. No. 112,424
Claims priority, application Germany, Feb. 18, 1970, P 20 07 273.5
Int. Cl. C07d 51/54
U.S. Cl. 260—211.5 R          18 Claims

ABSTRACT OF THE DISCLOSURE

Novel 2,3- or 2,5-disubstituted N(6)-benzyl-adenosine derivatives of the following formula

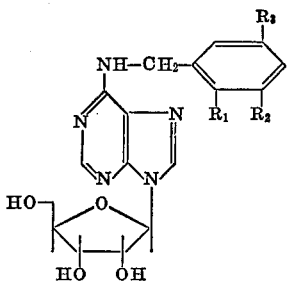

wherein
$R_1$ is halogen, alkyl, alkoxy or alkylthio;
$R_2$ and $R_3$ are members of the group consisting of hydrogen, halogen, alkyl, alkoxy and alkylthio with the proviso that one and only one of $R_2$ and $R_3$ is hydrogen; are outstandingly effective coronary dilators and lower the free fatty acid content of serum.

---

The present invention is concerned with new N(6)-aralkyl-adenosine compounds, with therapeutic compositions containing them, and their use as coronary dilators and as lypolysis inhibitors, i.e., to lower the free fatty acid content of blood.

The new N(6)-aralkyl-adenosine derivatives according to the present invention are compounds of the general formula:

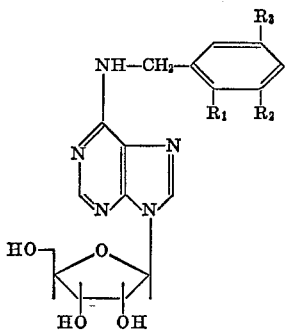

wherein
$R_1$ is halogen, alkyl, alkoxy or alkylthio, typically containing from 1 to 6 carbon atoms;
$R_2$ and $R_3$ are members of the group consisting of hydrogen, halogen, alkyl, alkoxy and alkylthio of e.g., up to 6 carbon atoms; with the proviso that one and only one of $R_2$ and $R_3$ is hydrogen.

We have found that the 2,3- or 2,5-disubstituted N(6)-benzyl-adenosine derivatives of general Formula I possess surprisingly good coronary dilatory properties and free fatty acid lowering properties.

The new compounds according to the present invention can be prepared, for example, either by reacting purine ribosides of the general formula:

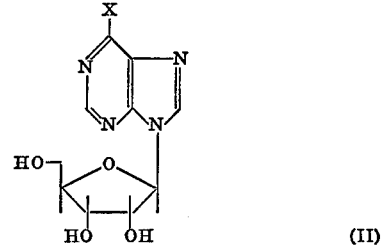

in which X is a halogen atom or a reactive mercapto group, with benzylamines of the general formula:

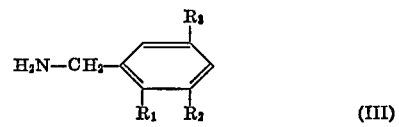

wherein $R_1$, $R_2$ and $R_3$ have the same meanings as above, possibly with the intermediate protection of the hydroxyl groups in the sugar radical, or by heating in alkaline solution $N^1$-substituted adenosine derivatives of the general formula:

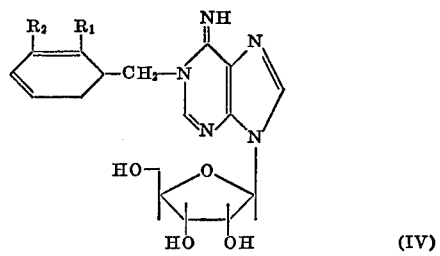

wherein $R_1$, $R_2$ and $R_3$ have the same meanings as above, or derivatives thereof in which the hydroxyl groups in the sugar radical are protected, whereafter, if necessary, the protective groups are removed by acidic saponification.

As reactive mercapto groups X in compounds of general Formula II, it is particularly preferred to use methylthio and benzylthio radicals.

As intermediate protective groups for the hydroxyl groups in the sugar radical, there can be used, for example, acyl derivatives, cyclic acetals and ketals. The acyl groups are preferably removed by alkaline saponification, whereas the cyclic acetals or ketals can be split off with acids; e.g. with formic acid or dilute mineral acids.

The compounds of general Formula IV used as starting materials can be prepared by the reaction of adenosine or of adenosine acetals or ketals with appropriate N-alkylation agents. Preferably, there are used compounds of the general formula:

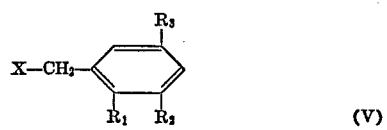

wherein $R_1$, $R_2$ and $R_3$ have the same meanings as above and Y is a reactive radical, such as a halogen atom, an aliphatic or aromatic sulphonyl radical or the like.

In a preferred variant of this process, the isolation of the compounds (IV) is omitted, the reaction solution being rendered weakly alkaline and heated for a short period of time. In this manner, there are obtained directly the compounds (I) or the corresponding acetals or ketals, which are subsequently split by acids to give the desired free adenosine derivatives.

In the case of the reaction of the purine-riboside derivatives (II) with the benzylamines (III), the reaction components are preferably heated together in a solvent and the reaction mixture thereafter worked up in the usual way.

The present invention also includes pharmaceutical compositions comprising at least one compound of general Formula I in admixture with a solid or liquid pharmaceutical diluent or carrier.

The following examples are given for the purpose of illustrating the present invention:

Example 1.—Preparation of N(6)-(2,5-dimethyl-benzyl)-adenosine 6.2 grams triacetyl-6-chloro-9-($\beta$-D-ribofuranosyl)-purine (see Zemlicka and Sorm, Coll. Czech Comm., 30, 1880/1965), 2.43 grams 2,5-dimethyl-benzylamine and 3.03 grams triethylamine were heated under reflux in 30 ml. isopropanol for 3 hours. The reaction mixture was then evaporated in a vacuum, the residue was taken up with chloroform and the chloroform phase was washed with water and, after drying, was evaporated. The residue was dissolved in 60 ml. methanol and, after the addition of 2 ml. 1 N sodium methylate solution, was boiled for 30 minutes. The precipitate which formed upon cooling was filtered off with suction and recrystallized from methanol/water (9:1), with the addition of some activated charcoal. There were obtained 3.5 grams (61% of theory) N(6)-(2,5-dimethyl-benzyl)-adenosine, which had a melting point of 163 to 165° C.

In an analogous manner, there were prepared the following compounds:

(a) N(6)-(2-fluoro-5-methyl-benzyl)adenosine by the reaction of triacetyl-6-chloro-9-($\beta$-D-ribofuranosyl)-purine with 2-fluoro-5-methyl-benzylamine; M.P. 167–168° C.; yield 45% of theory; and (b) N(6)-(2-chloro-5-methyl-benzyl)-adenosine by the reaction of triacetyl-6-chloro-9-($\beta$-D-ribofuranosyl)-purine with 2-chloro-5-methyl-benzyl-amine; M.P. 174–175° C.; yield 68% of theory.

Example 2.—Preparation of N(6)-(2-methylthio-5-methyl-benzyl)-adenosine 8.4 g. (45 mmole) 2-methylthio-5-methyl-benzyl chloride was dissolved in 80 ml. N,N-dimethyl-acetamide and, after the addition of 20 g. sodium iodide, the reaction mixture was stirred for 2 hours at 80° C. The reaction mixture was allowed to cool, 4 g. (15 mmole) adenosine were introduced into the reaction mixture and this was then stirred for 30 hours at 40° C. The solution was thereafter added dropwise, with stirring, to 600 ml. ether, the ether was decanted off from an oil which separates and this oil, after the addition of 100 ml. water and 10 ml. 2 N sodium hydroxide solution, was stirred for 4 hours at 40° C. The compound produced, which was initially in the form of an oily precipitate, was separated from the aqueous phase and dissolved in alcohol. From the alcoholic solution, there separated out 2.8 g. (45% of theory) N(6)-(2-methylthio-5-methyl-benzyl)-adenosine, which had a melting point of 118–120° C.

The compounds set out in the following table are prepared in an analogous manner:

TABLE

| Compound | M.P., °C. | Yield, percent |
|---|---|---|
| N(6)-(2-methyl-5-chlorobenzyl)adenosine | 153–155 | 63.0 |
| N(6)-(2-methyl-5-methoxy-benzyl)adenosine | 142–144 | 64.0 |
| N(6)-(2-methoxy-5-methyl-benzyl)adenosine | 174–176 | 69.0 |
| N(6)-(2-methoxy-5-chlorobenzyl)adenosine | 168–169 | 69.0 |
| N(6)-(2-methyl-5-isopropyl-benzyl)adenosine | 108–110 | 87.0 |
| N(6)-(2-methyl-5-fluorobenzyl)adenosine | 152–154 | 61.0 |
| N(6)-(2-methylthio-5-chlorobenzyl)adenosine | 102–104 | 73.0 |
| N(6)-(2-methyl-5-tert.-butyl-benzyl)adenosine | 114–116 | 34.0 |
| N(6)-(2,3-dimethyl-benzyl)adenosine | 144–146 | 40.0 |
| N(6)-(2-methyl-3-chlorobenzyl)adenosine | 179–183 | 64.0 |

Adenosine, upon intravenous administration to mammals and humans, produces a vasodilation. In particular, this effect is noticeable in the coronary vascular system wherein a maked increase in blood circulation results from the vasodilation produced by the administration of the adenosine (Berne, Blackmon and Gardner, J. Clin. Invest. 36, 1101 (1957)). Due to the rapid deamination of the adenosine, however, this effect is extremely transient. N(6)-substituted derivatives of adenosine also exert a marked coronary vasodilating effect of high specificity, but in contrast to adenosine, the effect is a prolonged one.

In order to compare the effectiveness of the novel N(6)-substituted adenosine derivatives, on coronary blood circulation, N(6)-benzyl adenosine which has already been described in the literature (J. A. Montgomery et al., J. Org. Chem. 28, 2304 (1963)) was selected as comparison agent. Furthermore, N(6)-(2-methylbenzyl)-adenosine described in U.S. Pat. No. 3,506,643 was compared with the new compounds of this invention.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen, i.e., to an improvement in the oxygen supply to the myocardium which is the ultimate aim sought to be achieved with all coronary dilating agents.

For the purpose of obtaining an exact basis for evaluating the results of the tests, the decrease in coronary arteriovenous oxygen difference (at the time of the maximum effect) is reported in volume percent as compared to the starting value. The greater the value reported the more significant was the coronary oxygen supply increase.

The tests were carried out using 32 alert unanesthetized dogs, each weighing between 12 and 16 kg. and following the procedure of Rayford, Huvos and Gregg, Proc. Soc. Exp. Biol. Med. 113, 876 (1963)). Catheters were implanted surgically into the Sinus coronarius, the aorta and the vena cava of the animals whereby it was made possible to photometrically determine the coronary arteriovenous saturation difference (Brinkman, Arch. Chir. Neerl. 1, 177 (1949)) and from the actual hemoglobin values obtained to convert the values into the corresponding volume percents. The compounds were administered intravenously in the amounts indicated in 1 ml. of a 5% Lutrol-9-solution (liquid polyethylene oxide, molecular weight about 400, BASF-Ludwigshafen) in 5.5 percent aqueous glucose.

The following compounds were employed in the test procedures:

The results of the test procedures are set out in the following table. From the table, it can be seen that the novel compounds exhibit marked coronary dilating properties, which are superior to that of the known compound Th 161. Most of the new compounds also show a better effectiveness than the known compound Th 322.

TABLE 1

| Compound | Doses, mg./kg., i.v. | Decrease of the coronary $O_2$ depletion[1] |
|---|---|---|
| N(6)-benzyladenosine | 0.4 | 2.5 |
| N(6)-(2-methylbenzyl)-adenosine | 0.4 | 6.4 |
| N(6)-(2,5-dimethylbenzyl)-adenosine | 0.05 | 6.0 |
| N(6)-(2,3-dimethyl-benzyl)-adenosine | 0.4 | 5.3 |
| N(6)-(2-methyl-3-chlorbenzyl)-adenosine | 0.1 | 6.0 |
| N(6)-(2-methyl-5-chlorbenzyl)-adenosine | 0.2 | 5.0 |
| N(6)-(2-methyl-5-fluorbenzyl)-adenosine | 0.4 | 6.8 |
| N(6)-(2-methylmercapto-5-methyl-benzyl)-adenosine | 0.2 | 6.7 |
| N(6)-(2-methylmercapto-5-chlorbenzyl)-adenosine | 0.2 | 7.5 |
| N(6)-(2-fluor-5-methylbenzyl)-adenosine | 0.4 | 9.0 |
| N(6)-(2-methyl-5-methoxybenzyl)-adenosine | 0.4 | 6.3 |
| N(6)-(2-chlor-5-methylbenzyl)-adenosine | 0.1 | 8.3 |

[1] At maximum effect in vol. percent as compared to the starting values.

The effectiveness of the instant compounds on the lowering of free fatty acids in the blood serum was determined following the procedure of Duncombe et al. [Clin. Chim. Acta 9, 122 (1964)]. The procedure was carried out using for each compound five Sprague-Dawley-rats, each weighing about 200 g. The animals were kept without food during 18 hours before application. The compounds were administered intraperitoneally (i.p.) in an isotonic saline solution. One hour after application of the compounds (or of the isotonic saline solution alone for establishing the control values) the animals were killed and exsanguinated.

In the following Table 2 the threshold dosis corresponds to a 30% reduction of the free fatty acids in the serum of treated animals compared with control animals.

TABLE 2

| Compound: | Threshold dosis (μg./kg. i.p.) |
|---|---|
| N(6)-(2-methylbenzyl)-adenosine | 1000 |
| N(6)-(2,5-dimethylbenzyl)-adenosine | 100 |
| N(6)-(2-methyl-5-chlorbenzyl)-adenosine | 250 |

Table 2 shows a substantially better effectiveness of the new compounds as compared with the known compound N(6)-(2-methylbenzyl)-adenosine.

As previously indicated, the adenosine derivatives of this invention are readily adapted to therapeutic use as cardio and circulatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragées powders, aqueous suspensions, solutions, and the like. Such carriers include solid diluents or filters, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1–50 mg. active ingredient per dosage unit. Preferably, the compositions are compounded so that for parenteral administration, 0.5–5 mg. active compound/dosage unit is present and for oral administration 2–10 mg. of compound/dosage unit.

It will be understood that the specification and examples are illustrative but not limitative of the present invention and that other embodiments with the spirit and scope of the invention will suggest themselves to those skilled in the art.

What is claimed is:

1. 2,3- or 2,5-disubstituted N(6)-benzyl-adenosine compound of the formula

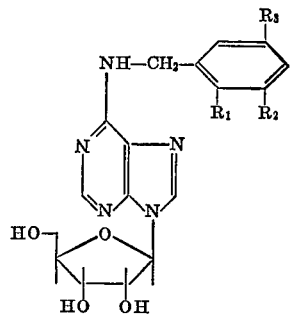

wherein
$R_1$ is halogen, alkyl, alkoxy or alkylthio;
$R_2$ and $R_3$ are members of the group consisting of hydrogen, halogen, alkyl, alkoxy and alkylthio with the proviso that one and only one of $R_2$ and $R_3$ is hydrogen, and all of said alkyl groups having from 1 to 6 carbon atoms.

2. Compound as claimed in claim 1 wherein said compound is 2,3-disubstituted N(6)-benzyl-adenosine.

3. Compound as claimed in claim 1 wherein said compound is 2,5-disubstituted N(6)-benzyl-adenosine.

4. Compound as claimed in claim 1 wherein none of $R_1$, $R_2$ and $R_3$ contains more than 6 carbon atoms.

5. Compound as claimed in claim 1 wherein $R_1$ is alkyl of from 1 to 6 carbon atoms.

6. Compound as claimed in claim 1 wherein $R_1$ is alkylthio of from 1 to 6 carbon atoms.

7. Compound as claimed in claim 1 wherein $R_1$ is halogen.

8. Compound as claimed in claim 1 wherein $R_2$ is alkyl of from 1 to 6 carbon atoms.

9. Compound as claimed in claim 1 wherein $R_2$ is halogen.

10. Compound as claimed in claim 1 wherein $R_3$ is alkyl of from 1 to 6 carbon atoms.

11. Compound as claimed in claim 1 wherein $R_3$ is halogen.

12. Compound as claimed in claim 1 wherein $R_3$ is alkoxy of from 1 to 6 carbon atoms.

13. Compound as claimed in claim 1 designated N(6)-(2,5-dimethylbenzyl)-adenosine.

14. Compound as claimed in claim 1 designated N(6)-(2-methyl-3-chlorobenzyl)-adenosine.

15. Compound as claimed in claim 1 designated N(6)-(2-methyl-5-chlorobenzyl)-adenosine.

16. Compound as claimed in claim 1 designated N(6)-(2-methylmercapto-5-chlorobenzyl)-adenosine.

17. Compound as claimed in claim 1 designated N(6)-(2-fluoro-5-methylbenzyl)-adenosine.

18. Compound as claimed in claim 1 designated N(6)-(2-chloro-5-methylbenzyl)-adenosine.

References Cited
UNITED STATES PATENTS

| 3,502,649 | 3/1970 | Thiel et al. | 260—211.5 R |
| 3,506,643 | 4/1970 | Thiel et al. | 260—211.5 R |
| 3,551,409 | 12/1970 | Kampe et al. | 260—211.5 R |

ELBERT L. ROBERTS, Primary Examiner

J. R. BROWN, Assistant Examiner

U.S. Cl. X.R.

424—180